(12) United States Patent  
Duportal et al.

(10) Patent No.: US 9,074,620 B2  
(45) Date of Patent: Jul. 7, 2015

(54) MEASURING DEVICE INCLUDING AN INDEXED LOCKING ARM

(71) Applicant: HEXAGON METROLOGY SAS, Courtaboeuf Cedex (FR)

(72) Inventors: Thibault Duportal, Prunay-Cassereau (FR); Jean-Luc Famechon, Villerable (FR)

(73) Assignee: HEXAGON METROLOGY SAS, Courtaboeuf Cedex (FR)

( * ) Notice: Subject to any disclaimer, the term of this patent is extended or adjusted under 35 U.S.C. 154(b) by 179 days.

(21) Appl. No.: 13/676,776

(22) Filed: Nov. 14, 2012

(65) Prior Publication Data

US 2013/0129406 A1  May 23, 2013

(30) Foreign Application Priority Data

Nov. 18, 2011 (FR) ...................................... 11 60548

(51) Int. Cl.
*G01B 5/008* (2006.01)
*F16C 11/10* (2006.01)
*G01B 21/04* (2006.01)

(52) U.S. Cl.
CPC ......... *F16C 11/10* (2013.01); *Y10T 403/32262* (2015.01); *G01B 21/047* (2013.01); *G01B 5/008* (2013.01)

(58) Field of Classification Search
CPC ...................................................... G01B 5/008
USPC ............................................................. 33/503
See application file for complete search history.

(56) References Cited

U.S. PATENT DOCUMENTS

| 3,750,295 | A | * | 8/1973 | Nordmann et al. ............. 33/548 |
| 3,818,596 | A | * | 6/1974 | Stemple et al. ................ 33/1 M |
| 4,213,244 | A | * | 7/1980 | Bell et al. ........................ 33/1 M |
| 4,262,952 | A | * | 4/1981 | Bradley ........................ 294/116 |
| 4,630,381 | A | * | 12/1986 | Sakata et al. .................... 33/503 |
| 4,676,002 | A | * | 6/1987 | Slocum ........................ 33/1 MP |
| 5,956,857 | A | * | 9/1999 | Raab ................................ 33/503 |
| 5,991,704 | A | * | 11/1999 | Rekar et al. .................... 702/168 |
| 6,158,136 | A | * | 12/2000 | Gotz et al. ...................... 33/503 |
| 6,253,458 | B1 | * | 7/2001 | Raab et al. ...................... 33/503 |
| 7,269,910 | B2 | * | 9/2007 | Raab et al. ...................... 33/503 |
| 8,099,877 | B2 | * | 1/2012 | Champ .......................... 33/503 |
| 2002/0087233 | A1 | * | 7/2002 | Raab .............................. 700/262 |
| 2010/0180709 | A1 | | 7/2010 | Choi et al. ................. 74/490.05 |

FOREIGN PATENT DOCUMENTS

WO    WO 00/34733 A1   6/2000   ............... G01B 5/00

* cited by examiner

*Primary Examiner* — Christopher Fulton
(74) *Attorney, Agent, or Firm* — Sunstein Kann Murphy & Timbers LLP

(57) ABSTRACT

A measuring device including a base on which is mounted, to pivot about a horizontal axis, between a high position and a low position, a first end of an articulated arm having a second end provided with a pointing member. A position locking device is mounted between the base and the first end, the position locking device comprising a pawl mounted so as to oppose movement of the arm toward the low position and connected to means for disengagement of the pawl.

21 Claims, 3 Drawing Sheets

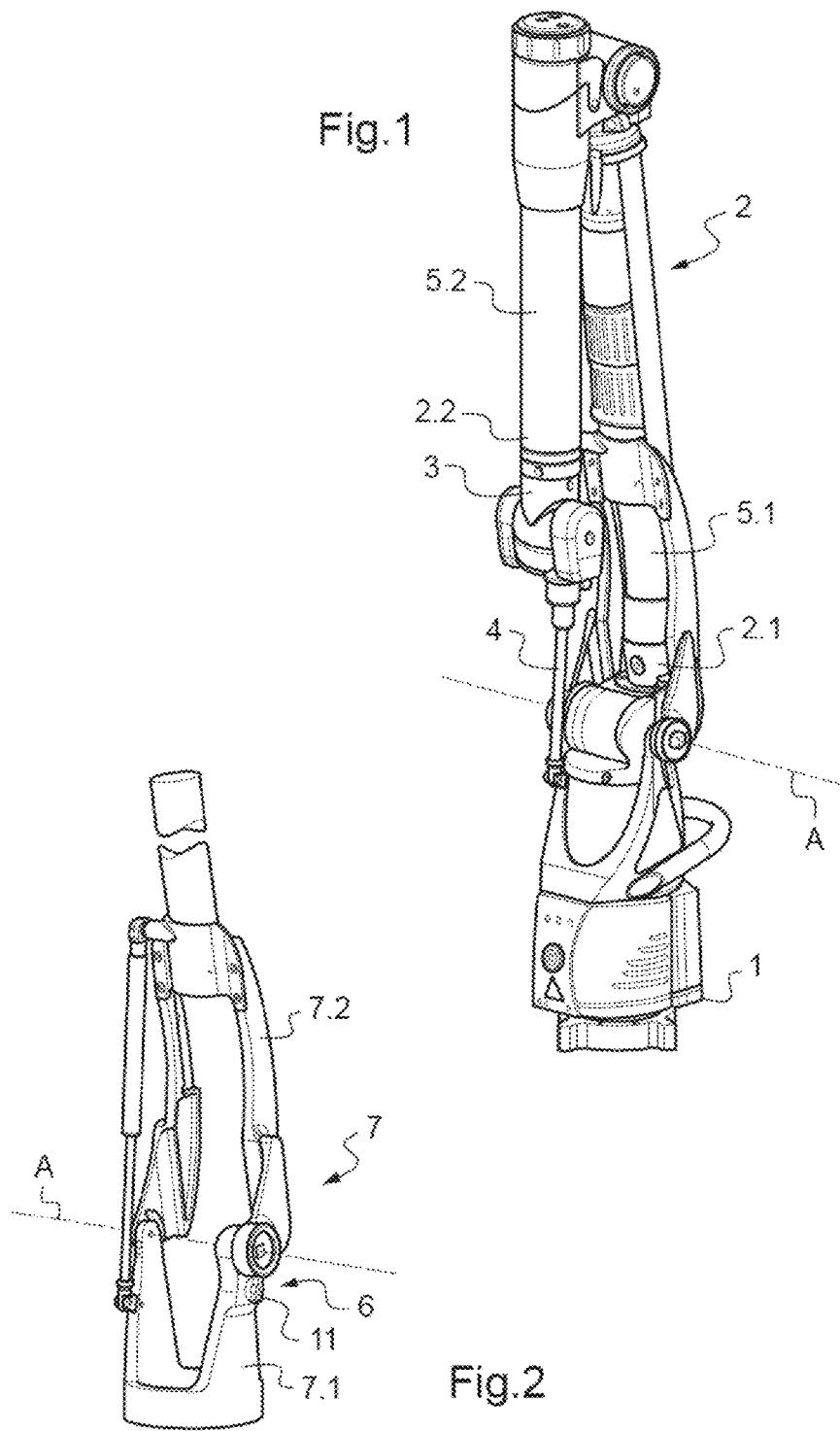

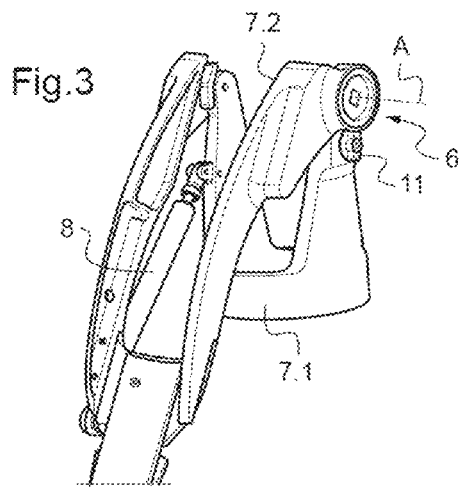
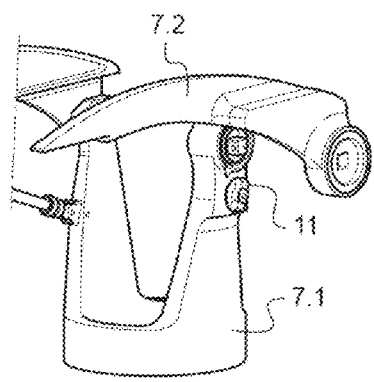
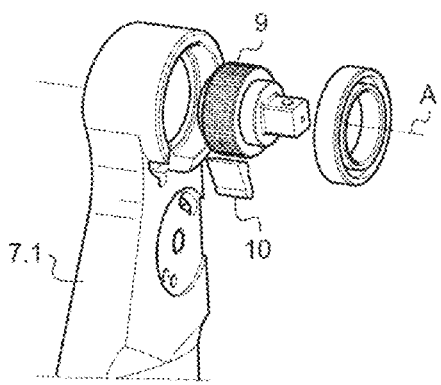

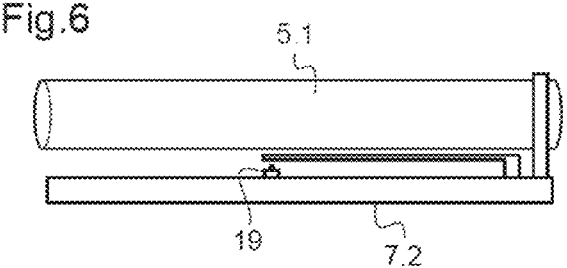
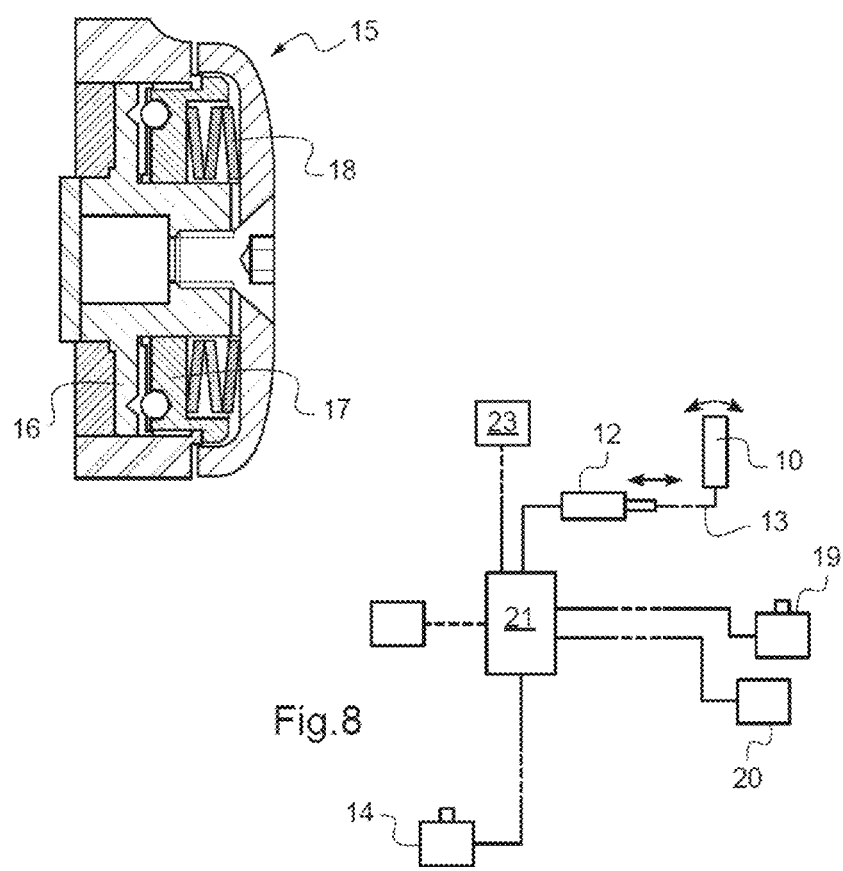

MEASURING DEVICE INCLUDING AN INDEXED LOCKING ARM

CROSS-REFERENCE TO RELATED APPLICATIONS

This application claims the benefit of priority to French Patent Application Serial Number FR11 60548, filed on Nov. 18, 2011.

TECHNICAL FIELD

The present invention concerns a measuring device including an articulated arm. Such a measuring device is used, for example, to verify the dimensions of a part, for example in the framework of quality control operations.

BACKGROUND ART

There are known measuring devices including a base on which is mounted to pivot about a horizontal axis a first end of an articulated arm having a second end provided with a pointing member such as a feeler or a laser beam emitter. The second end of the arm is also provided with a manipulator handle that enables the operator to apply the feeler against the surface of the object to be measured or to direct the laser beam emitter toward a portion of the object to be measured.

The articulated arm generally comprises a first segment articulated on one side to the base and on the other to a second segment having a free end provided with an articulated wrist carrying the manipulator handle and the pointing member.

In these measuring devices, the articulated arm is generally designed to have a stable position of rest or non-use in which the first segment extends substantially vertically abutted against a portion of the base and the second segment is folded against the first segment. In this position, the centre of gravity of the assembly comprising the segments, wrist, manipulator handle and pointing member lies substantially in vertical alignment with the base and tends to maintain the first segment abutted against the base, thus ensuring the stability of said assembly.

However, an accidental impact on the arm risks causing it to leave its rest position, the arm then tilting because of the effect of its own weight, starting a downward movement until the arm strikes an obstacle. This type of impact can lead to deterioration of the pointing member and also of the members guiding movement of the arm and, more generally, of the structure of the arm as a whole.

It is known to mount an elastic cylinder between the base and the first segment of the arm to compensate the weight of the arm. An ancillary effect of this cylinder is to reinforce the stability of the arm in the rest position.

Although the risk of accidental tilting of the arm is then reduced, it nevertheless remains high.

To reduce this risk further, some measuring devices comprise a member for blocking sliding of the rod of the cylinder. This locking member takes the form of a removable spacer having a substantially U-shaped cross section that is engaged over the rod of the cylinder when the arm is in the rest position so that the spacer opposes movement toward each other of the body of the cylinder and the free end of the rod of the cylinder. There nevertheless exists a risk of losing the spacer, in which case the locking of the arm is no longer possible, or, to the contrary, of leaving the spacer on the rod when the operator exerts a force on the arm tending to cause it to leave its rest position, in which case the arm and the spacer are subject to stresses risking weakening or even deteriorating them.

SUMMARY

An object of the invention is to provide a measuring device having a more stable rest position.

To this end the invention provides a measuring device including a base on which is mounted, to pivot about a horizontal axis, between a high position and a low position, a first end of an articulated arm having a second end provided with a pointing member. A position locking device is mounted between the base and the first end, the position locking device comprising a pawl mounted so as to oppose movement of the arm toward the low position and connected to means for disengagement of the pawl.

Accordingly, the pawl constitutes simple and reliable means of locking the arm in position ensuring indexed locking of the arm in position. When it is engaged, the pawl opposes movement of the arm toward the low position, preventing the arm from falling and preventing the deterioration that this might cause.

Other features and advantages of the invention will emerge on reading the following description of particular nonlimiting embodiments of the invention.

BRIEF DESCRIPTION OF THE DRAWINGS

The appended drawings are referred to, in which:

FIG. 1 is a perspective view of a measuring device of the invention, the arm being in the high rest position, FIG. 2 is a partial perspective view of an armature of this arm in the high position, FIG. 3 is a partial perspective view of the armature of the arm in a low position, FIG. 4 is a partial exploded perspective view of the arm showing the pawl device, FIG. 5 is a partial exploded perspective view of the pawl device, FIG. 6 is a diagrammatic view in elevation showing the deflection of the first segment of the arm, FIG. 7 is a partial view in section showing the torque limiter, FIG. 8 is a diagrammatic view showing the control circuit of an actuator for disengagement of the pawl.

DETAILED DESCRIPTION OF SPECIFIC EMBODIMENTS

Referring to the figures, the measuring device conforming to the invention comprises a base 1 on which is mounted, to pivot about a horizontal axis A, between a low position and a high position, a first end 2.1 of an articulated arm, generally designated at 2, having a second end 2.2 provided with an articulated wrist 3 to which a pointing member 4 is fixed.

To be more precise the arm 2 includes a first segment 5.1 having a first end forming the first end 2.1 of the arm 2 and a second end to which is articulated a first end of a second segment 5.2 having a second end forming the second end 2.2 of the arm 2.

The arrangement and the structure of the articulations of the arm 2, the base 1 and the wrist 3 are known in themselves and will not be described in detail here.

A position locking device, generally designated at 6, is mounted between the base and the first end 2.1 of the articulated arm 2.

To be more precise, the device comprises an articulated armature 7 including a fixed part 7.1 rigidly fixed to the base 1 and a mobile part 7.2 mounted on the fixed part 7.1 to lie under the first segment 5.1 and to pivot about the horizontal axis A. Here the fixed part 7.1 has a tubular shape and is threaded onto the base 1. An elastic cylinder 8 is mounted between the parts 7.1, 7.2 and tends to hold the part 7.2 in contact with the first segment 5.1. The articulated armature 7 forms a brace at the level of the articulation of the arm 2 to the base 1.

The position locking device comprises a toothed wheel 9 coaxial with the axis A and constrained to rotate with the mobile part 7.2 and a pawl 10 mounted on the fixed part 7.1 to be mobile between an active position in which the pawl is engaged between two teeth of the toothed wheel to oppose movement of the arm 2 toward the low position and an inactive position in which the pawl 10 is disengaged from the toothed wheel 9. A manual mechanical control button 11 is mounted on the fixed part for moving the pawl 10 between its two positions.

The mechanical control button 11 forms part of disengagement means of the pawl 10 that also comprise an electromechanical actuator 12 connected to the pawl 10 by a mechanical transmission chain represented symbolically at 13 for moving the latter from its active position to its inactive position. The electromechanical actuator 12 is connected to a control unit 21 in turn connected to a power supply 22 such as the mains, the power supply of the arm 2 or a battery. An electrical control button 14 is mounted on the second end 2.2 of the articulated arm 2 and is electrically connected to the control unit 21. Here the electromechanical actuator 12 is an electromagnetic actuator such as a solenoid, a stepper motor or a linear actuator.

Finally, the disengagement means comprise a torque limiter generally designated at 15. The torque delimiter 15 comprises a first plate 16 rigidly fastened to the toothed wheel 9 and a second plate 17 rigidly fastened to the mobile part 7.2. The plates 16, 17 bear elastically against each other by means of Belleville spring washers 18. The plate 17 includes housings to receive balls projecting from the plate 16 so that when a torque exceeding a predetermined threshold is exerted on the arm and therefore on the mobile part 7.2 and the pawl 10 is interengaged with the toothed wheel 9, the balls can can leave their housings by pushing the plates back one relative to the other against the force of the spring washers, then allowing pivoting of the plates 16, 17 relative to each other.

A force sensor 19 is mounted on the mobile part 7.2 in the vicinity of the first segment 5.1 of the arm 2 and is connected to an alert member 20. The alert member 20 is a luminous warning device or lamp, for example, an audible warning device or a vibrating element mounted on the second end of the arm. The force sensor 19 is mounted to detect flexing of the mobile part 7.2. Alternatively, the sensor 19 may be adapted to measure variation of the distance between the mobile part 7.2 and the segment 5.1.

The disengaging means are arranged to be able to effect disengagement of the pawl 10 and are connected to a sensor 23 for sensing the high rest position of the arm 2 to command engagement of the pawl 10 when the arm 2 is in the rest position (see FIGS. 1 and 2). Similarly, there may be provision for detecting a substantially fixed position of the arm for a predetermined duration and then commanding automatic engagement of the pawl 10 to relieve the operator.

The control unit 21 is known in itself and for example comprises a processor programmed in a manner known in itself to provide the functions mentioned above.

Of course, the invention is not limited to the embodiment described but encompasses any variant falling within the field of the invention as defined by the claims.

In particular, the disengaging means may have a structure different from that described; for example, the disengaging means comprise a manual control button mounted on the base and electrically connected to the actuator. If the control button is connected to the actuator by a wireless connection, the control button can be mounted at any location on the measuring device or even on an element external thereto.

Alternatively, the electromechanical actuator is a piezoelectric actuator.

The mechanical transmission chain may be reduced to its simplest expression: the output rod of a linear actuator may be connected directly to the pawl 10.

The torque limiter may comprise a friction ring interleaved between the toothed wheel and the shaft on which the toothed wheel is mounted, the friction ring being adapted to transmit to the toothed wheel a maximum torque less than a predetermined value.

The electrical connection of the control button to the actuator may comprise wire or wireless connecting means, for example infrared or radio-frequency connecting means, etc.

The invention claimed is:

1. A measuring device including a base on which is mounted, to pivot about a horizontal axis, between a high position and a low position, a first end of an articulated arm having a second end provided with a pointing member, characterized in that a position locking device is mounted between the base and the first end, the position locking device comprising:
   a pawl having an active position configured to oppose movement of the arm toward the low position, the pawl having an inactive position configured to remove arm movement opposition by the pawl, the inactive position permitting substantially free movement of the arm toward the low position.

2. The device according to claim 1, further comprising an electromechanical actuator configured to change the position of the pawl, the electromechanical actuator being connected to the pawl by a mechanical transmission chain configured to move the pawl.

3. The device according to claim 2, wherein the electromechanical actuator is a piezoelectric actuator.

4. The device according to claim 2, wherein the electromechanical actuator comprises an electromagnetic actuator.

5. The device according to claim 4, wherein the electromagnetic actuator comprises a solenoid, a stepper motor or a linear actuator.

6. The device according to claim 1, further comprising manual control button configured to change the position of the pawl, the manual control button being electrically connected to the actuator.

7. The device according to claim 6, wherein the manual control button is mounted on the base and electrically connected to the actuator.

8. The device according to claim 6, wherein the manual control button is mounted on the second end of the arm.

9. The device according to claim 1, further comprising a torque limiter configured to change the position of the pawl.

10. The device according to claim 9, wherein, the pawl being connected to the base to cooperate with a toothed wheel connected to the first end of the arm, the torque limiter comprises a first plate rotationally connected to the first end of the arm and a second plate rotationally connected to the toothed wheel, the plates bearing elastically against each other, one of the plates including a housing for receiving at least one ball projecting from the other plate so that if a torque greater than a predetermined threshold is exerted on the arm, the ball can leave its housing, allowing pivoting of the plates relative to each other.

11. The device according to claim 9, wherein, the pawl being connected to the base to cooperate with a toothed wheel connected to the first end of the arm, the torque limiter comprises a friction ring interleaved between the toothed wheel and the shaft on which the toothed ring is mounted, the friction ring being adapted to transmit to the toothed wheel a maximum torque less than a predetermined value.

12. The device according to claim 1, further comprising a force sensor is mounted on a segment of the arm adjacent the first end, the force sensor being connected to an alert member.

13. The device according to claim 12, wherein the force sensor is configured to measure deformation of the segment of the arm.

14. The device according to claim 13, further comprising a mobile part that lies under the segment of the arm, parallel to the segment of the arm, the mobile part being away from the segment of the arm, the sensor being mounted between the mobile part and the segment of the arm, the sensor being configured to detect a variation of the distance between the mobile part and the segment of the arm.

15. The device according to claim 12, wherein the alert member comprises at least one of the following elements: an audible warning device, a luminous warning device, a vibrating element mounted on the second end of the arm.

16. The device according to claim 1, further comprising disengaging means for causing engagement of the pawl and connected to a sensor for detection of a predetermined position of non-use of the arm to command the engagement of the pawl to the active position when the arm is in the non-use position.

17. A measuring device including a base on which is mounted, to pivot about a horizontal axis, between a high position and a low position, a first end of an articulated arm having a second end provided with a pointing member, characterized in that a position locking device is mounted between the base and the first end, the position locking device comprising:
 a pawl mounted so as to oppose movement of the arm toward the low position and connected to means for disengagement of the pawl, wherein the disengaging means comprise a torque limiter.

18. The device according to claim 17, wherein, the pawl being connected to the base to cooperate with a toothed wheel connected to the first end of the arm, the torque limiter comprises a first plate rotationally connected to the first end of the arm and a second plate rotationally connected to the toothed wheel, the plates bearing elastically against each other, one of the plates including a housing for receiving at least one ball projecting from the other plate so that if a torque greater than a predetermined threshold is exerted on the arm, the ball can leave its housing, allowing pivoting of the plates relative to each other.

19. The device according to claim 17, wherein, the pawl being connected to the base to cooperate with a toothed wheel connected to the first end of the arm, the torque limiter comprises a friction ring interleaved between the toothed wheel and the shaft on which the toothed ring is mounted, the friction ring being adapted to transmit to the toothed wheel a maximum torque less than a predetermined value.

20. The device according to claim 17, wherein the disengagement means comprises an electromechanical actuator connected to the pawl by a mechanical transmission chain to move the latter.

21. A measuring device including a base on which is mounted, to pivot about a horizontal axis, between a high position and a low position, a first end of an articulated arm having a second end provided with a pointing member, characterized in that a position locking device is mounted between the base and the first end, the position locking device comprising a toothed wheel coaxial with the axis and constrained to rotate with the first end of the articulated arm and a pawl mounted to be mobile between 1) an active position in which the pawl is engaged between two teeth of the toothed wheel to oppose movement of the arm toward the low position and 2) an inactive position in which the pawl is disengaged from the toothed wheel, the pawl being connected to means for disengagement of the pawl,
 a force sensor mounted on a segment of the arm adjacent the first end and connected to an alert member, the force sensor configured to measure deformation of the segment of the arm,
 the measuring device also comprising an articulated armature including a fixed part rigidly fixed to the base and a mobile part mounted on the fixed part to lie under the segment parallel thereto, the mobile part being positioned away from the segment, the sensor being mounted between the mobile part and the segment to detect a variation of the distance between the mobile part and the segment.

* * * * *